United States Patent
Huberman et al.

(10) Patent No.: US 12,498,250 B2
(45) Date of Patent: Dec. 16, 2025

(54) LOCALIZATION USING TESSELLATED GRIDS

(71) Applicant: Mapsted Corp., Oakville (CA)

(72) Inventors: Sean Huberman, Guelph (CA); Joshua Karon, Toronto (CA); Ahmed Mahmood, Milton (CA)

(73) Assignee: Mapsted Corp, Oakville (CA)

( * ) Notice: Subject to any disclaimer, the term of this patent is extended or adjusted under 35 U.S.C. 154(b) by 228 days.

(21) Appl. No.: 17/134,224

(22) Filed: Dec. 25, 2020

(65) Prior Publication Data
US 2022/0205808 A1 Jun. 30, 2022

(51) Int. Cl.
| | |
|---|---|
| G01C 21/00 | (2006.01) |
| G01C 21/20 | (2006.01) |
| G06F 16/22 | (2019.01) |
| H04W 4/029 | (2018.01) |
| H04W 4/33 | (2018.01) |

(52) U.S. Cl.
CPC ......... G01C 21/383 (2020.08); G01C 21/206 (2013.01); G06F 16/2246 (2019.01); H04W 4/029 (2018.02); H04W 4/33 (2018.02)

(58) Field of Classification Search
CPC .. G01C 21/32; G01C 21/3667; G01C 21/206; G01C 21/3889; G01C 21/20; G01C 21/383; H04W 4/33; H04W 4/029; H04W 64/00; G06F 16/2246; G06F 16/29; G06F 16/5854; G06F 16/9027; G06F 16/444; G06F 16/7854; G06F 16/22; G06F 16/35; G06F 16/901; G06F 16/9017; G06F 16/9024
See application file for complete search history.

(56) References Cited

U.S. PATENT DOCUMENTS

| | | | | |
|---|---|---|---|---|
| 2013/0230208 A1* | 9/2013 | Gupta | ............ | G01C 21/206 |
| | | | | 382/103 |
| 2019/0373407 A1* | 12/2019 | Bhatti | ............ | G01C 21/3881 |
| 2020/0037113 A1* | 1/2020 | Tyagi | ............ | H04W 4/029 |

FOREIGN PATENT DOCUMENTS

| | | | | |
|---|---|---|---|---|
| CN | 110111410 A | * | 8/2019 | |
| CN | 110243366 A | * | 9/2019 | ........ G01C 21/206 |
| GB | 2402778 A | * | 12/2004 | ........ G01C 21/3881 |
| WO | WO-2005089434 A2 | * | 9/2005 | ........ G06V 30/422 |

* cited by examiner

*Primary Examiner* — Alison Slater
*Assistant Examiner* — Jing Gao
(74) *Attorney, Agent, or Firm* — Harshdeep Chawla

(57) ABSTRACT

Examples for localization using tessellated grids are described. In an example, a plurality of physical entities can be identified in an indoor space and each physical entity can be georeferenced to a coordinate system. The indoor space can be divided into a grid of polygonal tiles abutting adjacent polygonal tiles, and arranged in a hierarchical structure with the tiles in one level of the hierarchical structure being substantially representable by polygonal tiles in other levels of the hierarchical structure. The grid is then spatially indexed by associating each physical entity with a polygonal tile from amongst the polygonal tiles in each hierarchical level, thereby correlating a georeference of the physical entity with the polygonal tile. Based on the spatial indexing, a grid map for the indoor space can be generated for localizing mobile devices in the indoor space.

14 Claims, 7 Drawing Sheets

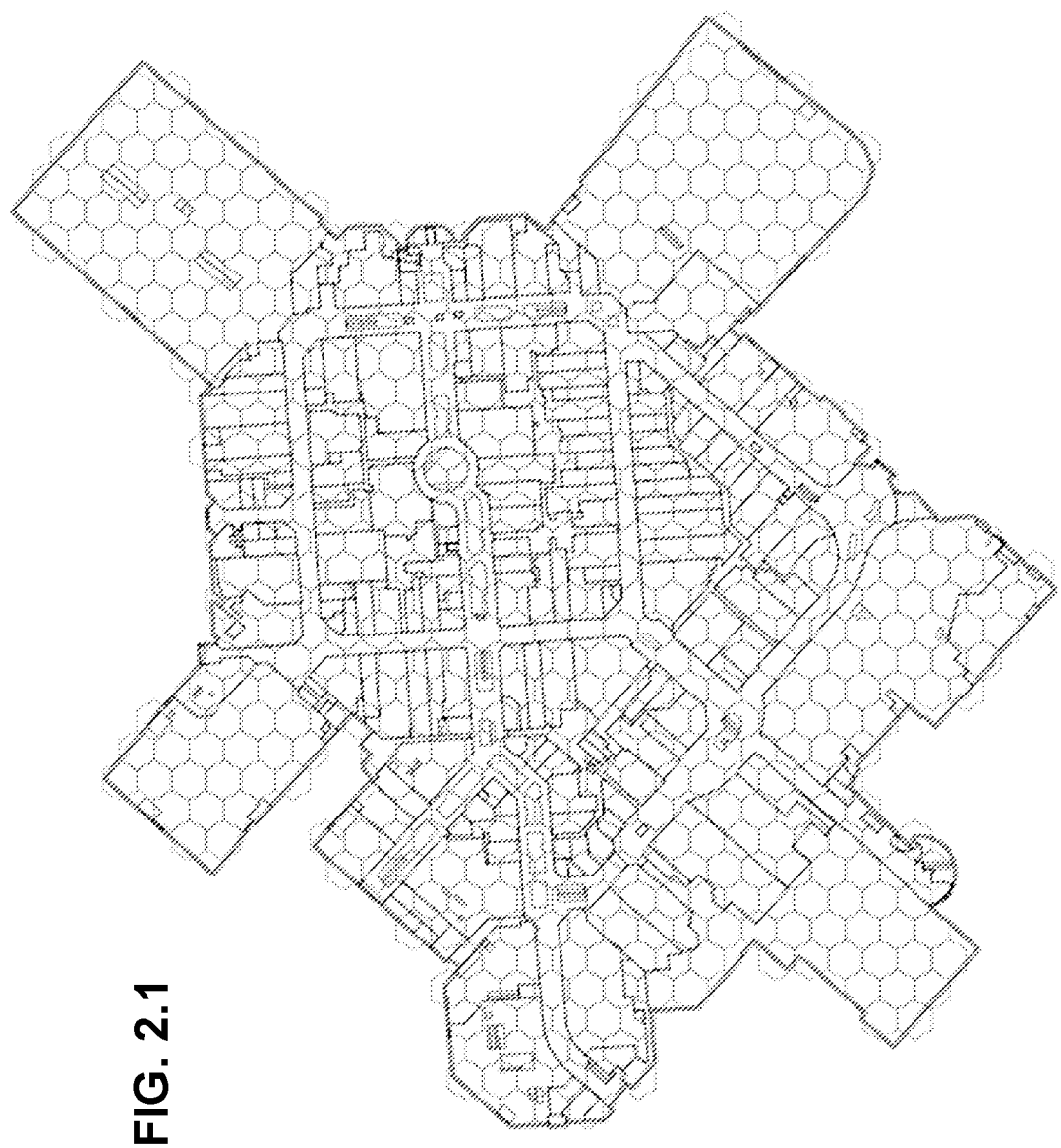
FIG. 2.1

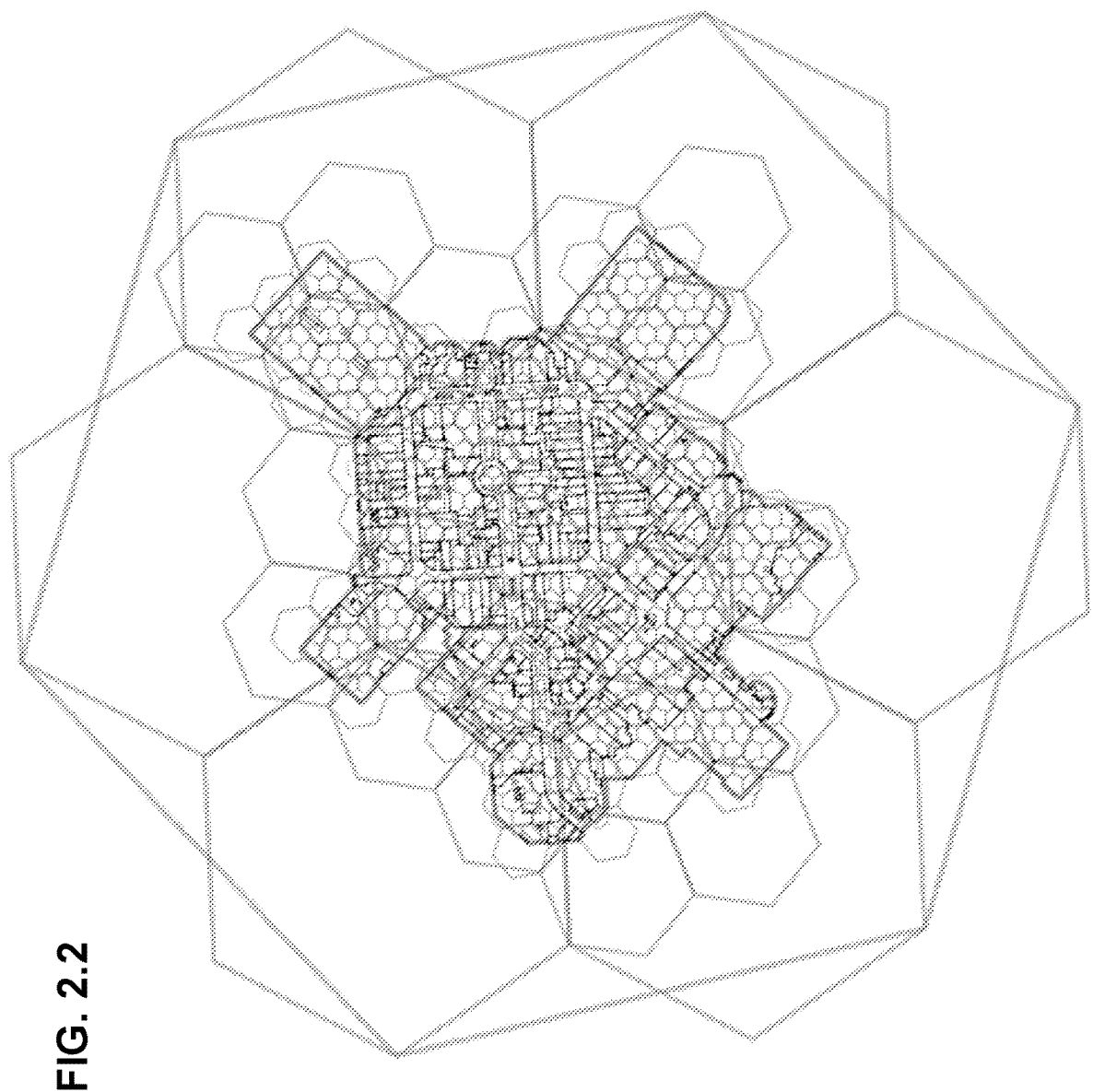
FIG. 2.2

400

---

IDENTIFY A PLURALITY OF PHYSICAL ENTITIES IN AN INDOOR SPACE, EACH OF THE PHYSICAL ENTITIES GEOREFERENCED TO A COORDINATE SYSTEM
410

DIVIDE THE INDOOR SPACE INTO A GRID OF TESSELLATED POLYGONAL TILES IN A HIERARCHICAL STRUCTURE, A POLYGONAL TILE HIGHER IN THE HIERARCHY BEING SUBSTANTIALLY REPRESENATBLE BY A PLURALITY OF POLYGONAL TILES LOWER IN THE HIERARCHY
420

SPATIALLY INDEX THE GRID BY ASSOCIATING EACH PHYSICAL ENTITY WITH A POLYGONAL TILE AMONGST THE POLYGONAL TILES IN EACH HIERARCHICAL LEVEL TO CORRELATE A GEOREFERENCE OF THE PHYSICAL ENTITY WITH THE POLYGONAL TILE
430

GENERATE A FLOOR PLAN FOR THE INDOOR SPACE BASED ON THE INDEXING TO LOCALIZE MOBILE DEVICES
440

OBTAIN SPATIAL DATA GENERATED BY A MOBILE DEVICE (TO BE LOCALIZED) IN AN INDOOR SPACE, THE INDOOR SPACE DIVIDED INTO A HIERARCHICAL GRID OF TESSELLATED POLYGONAL TILES, THE INDOOR SPACE HAVING A PLURALITY OF PHYSICAL ENTITIES GEOREFERENCED TO A COORDINATE SYSTEM AND INDEXED SPATIALLY WITH THE GRID
510

COMPARE THE SPATIAL DATA WITH GEOREFERENCES FOR THE INDOOR SPACE TO IDENTIFY A POLYGONAL TILE IN THE SIZE-WISE HIERARCHY, THE IDENTIFIED POLYGONAL TILE INDICATIVE OF A POTENTIAL INSTANTANEOUS LOCATION OF THE MOBILE DEVICE THEREIN
520

RENDER AN INDOOR-LOCATION BASED SERVICE TO THE MOBILE DEVICE BASED ON THE POTENTIAL INSTANTANEOUS LOCATION OF THE MOBILE DEVICE
530

FIG. 5

LOCALIZATION USING TESSELLATED GRIDS

TECHNICAL FIELD

The disclosure herein relates to the field of localizing using tessellated grids.

BACKGROUND

Location-based services are rapidly expanding as a ubiquitous service proposition. Outdoor location technologies are mainly based on GPS (Global Positioning System) technologies. At the same time, users of mobile devices have started to increasingly use and depend on indoor positioning and navigation applications and features. Particularly, indoor positioning and navigation of a mobile device carried or worn by a user can be difficult to achieve using satellite-based navigation systems, such as GPS, because the satellite-based navigation technology generally relies on the line-of-sight between the mobile device and the satellite. Accordingly, when the connection between the two becomes unavailable, or is only sporadically available, such as within enclosed, or partially enclosed, urban infrastructure and buildings, including hospitals, shopping malls, airports, university campuses and industrial warehouses, the positioning and navigational capability of the satellite-based navigation system becomes unreliable. In turn, indoor navigation and positioning solutions may rely on various sensors including accelerometers, gyroscopes, and magnetometers that may be commonly included in mobile phones and other computing devices, in conjunction with acquired wireless communication signal data to localize the mobile device. Thus, effectiveness of the indoor navigation and positioning solution is directly dependent on the quality of data, sensor or signal, and the manner of utilization of data for localization.

BRIEF DESCRIPTION OF THE DRAWINGS

FIG. 2.1 illustrates, as an example, the indoor space divided plan into a plurality of polygonal tiles.

FIG. 2.2 illustrates, as an example, the indoor space represented as a hierarchical grid.

FIG. 4 illustrates, as an example, a method of facilitating localization of mobile devices in an indoor space based on selection of spatial-resolution.

FIG. 5 illustrates, as an example, a method of localizing mobile devices in an indoor space based on selection of spatial-resolution.

DETAILED DESCRIPTION

Figure 1:
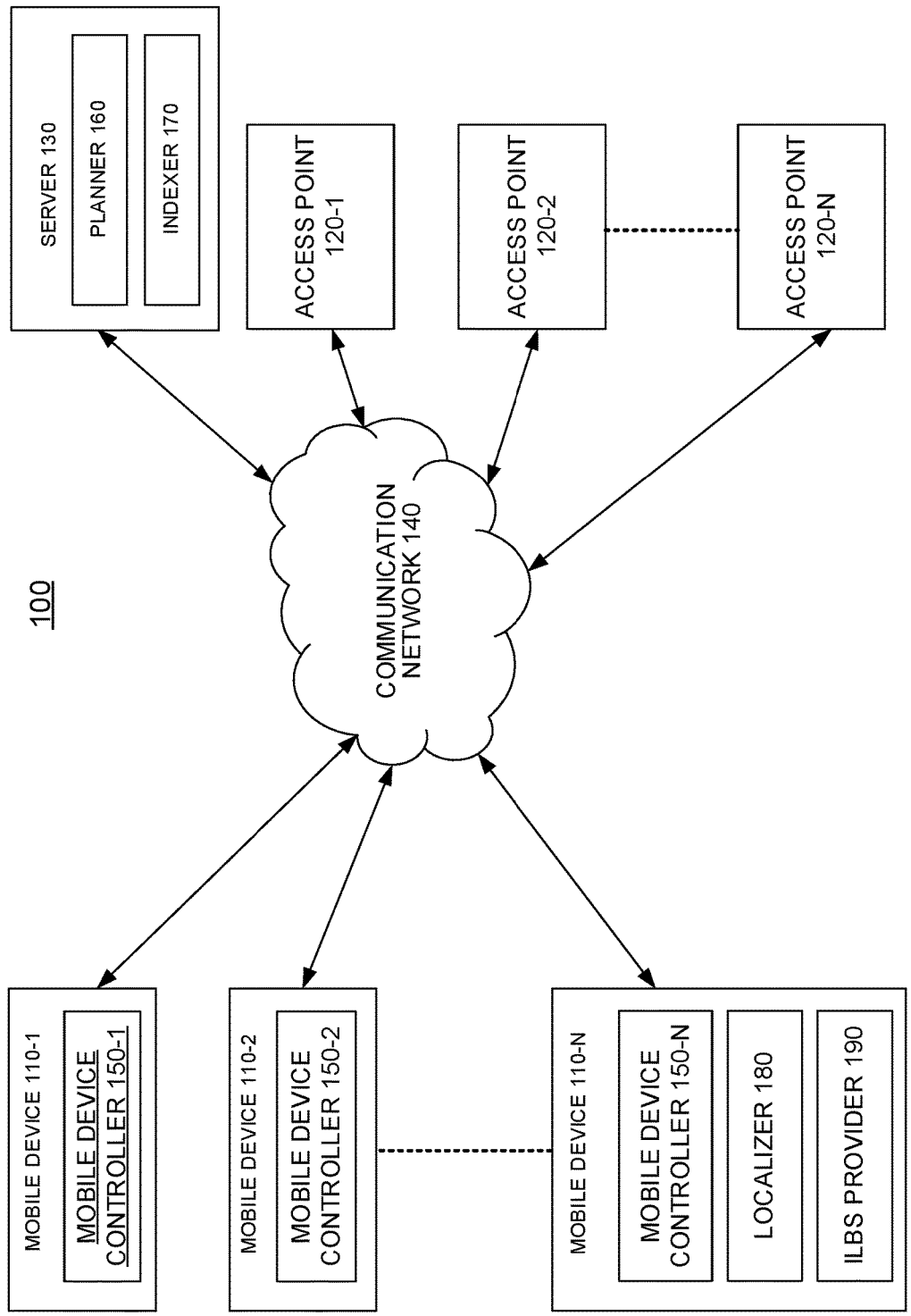
FIG. 1 illustrates, as an example, a network environment for localizing mobile devices in an indoor space based on selection of spatial-resolution.

Among other benefits and technical effects, embodiments provided herein provide for efficiently, effectively, and accurately providing indoor-location based services to mobile devices in an indoor space. According to an aspect, the present subject matter involves a tessellated, hierarchical grid in which its individual components are interlinked with each other at different hierarchical levels. The tessellation or tiled structure of the grid as well as the interlinked hierarchical structure allows for representing the indoor space in an effective and true manner, and at the same time, allows for indexing the spatial data associated with the indoor space in a manner that the information is easily and efficiently retrievable. As used in the present context, as an example only, the spatial data can be understood as the data which can identify the geolocation of a region or a physical entity in the indoor space, and the correlation of such geolocation with one or more tiles and one or more levels in the hierarchical grid.

Generally, large indoor spaces, such as shopping malls, airports, parking garages, and warehouses, that attract significant user traffic also seek to host a wide set of services that may be of interest to a user. Such services may often be specifically curated for a user based directly on a location of the mobile device of the user. For instance, an effective indoor location-based services (ILBS) system is able to generate suggestions of services and locations to the user by initiating a quick search in the vicinity of a user's location indicated by the user's mobile device. In few other instances, the ILBS systems may further allow a user to search for services or amenities and pin them as potential points-of-interest (POIs). At the same time, the ILBS systems may even offer efficient routing or navigation, coupled with user-friendly navigation, to reach a user-selected destination. Therefore, such indoor-location based services, given their application, form an obvious integration option for indoor positioning systems (IPSs) that seek to accurately localize or locate mobile devices in such indoor spaces. In other words, a natural application of IPSs lies in offering indoor location-based services.

In addition, recent technological advancements which allow the universally available smart mobile devices packing a variety of sensors for gathering data that is usable for positioning, has extended the reach of IPS as well as ILBS. Typically, the IPS uses spatial data generated by such mobile devices in the indoor location to execute efficient and effective localization. The spatial data can be linked to entities in a floor plan, and the entities are, in turn, georeferenced, thereby facilitating localization. In view of the enormous amount of spatial data that must be parsed by the IPS, the manner in which the spatial data is representative of the indoor space and the ease of access and use of the spatial data is of particular relevance to the IPSs. Both, the representation of the indoor space by the spatial data as well as the ease of access of the spatial data, may be governed by the technique of spatial indexing implemented by the IPS. In turn, therefore, the spatial indexing may have a direct bearing on the effectiveness and the efficiency of the IPS, which may be of particular relevance if the IPS is to offer time-sensitive services, such as navigation.

Conventionally, in one of the many approaches, the indoor space is represented as a connected network of linearly positioned dots along walking paths that may be traversed and are indicative of the possible locations of the mobile device in the indoor space. In such a manner of representation of the indoor space by the corresponding spatial data and the indexing thereof, the localization capability may be limited and the localization may always be a tradeoff between efficiency/speed and accuracy. For instance, for an accurate measurement, a large region of the indoor space may have to be considered to increase the probability of locating the mobile device therein, which can involve considerably large amount of spatial data to be accessed and processed leading to a slow rate of localization and, therefore, ineffectiveness in providing the indoor location-based services.

Examples of the present subject matter are described herein which seek to address, inter alia, the above outlined deficiencies. The present subject matter discloses a manner by which optimal indoor localization, for example, accurate as well as computationally light, is achieved which can facilitate rendering of efficient as well as accurate and effective indoor location-based services. According to an aspect, the present subject matter involves the use of a multi-layered, hierarchical grid made of polygons that cover the floor plan of the indoor space. The indoor space can be divided into a grid of polygonal tiles abutting adjacent polygonal tiles, i.e., having a tessellated structure. In addition, the polygonal tiles can also be provided in a hierarchical structure, such that a polygonal tile higher in the hierarchical structure substantially covers two or more smaller polygonal tiles lower in the hierarchical structure. The physical entities in the indoor space can be georeferenced and then cross-referenced with the polygonal tiles to correlate the georeference of each physical entity with the corresponding polygonal tile in each hierarchical level. The georeference may be any information which can be used to indicate the location of the physical entity. In one example, as part of georeferencing, global or absolute coordinates are used to indicate the location of the physical entities. In other examples, a local coordinate system, for instance, associated with the indoor space, may be used for georeferencing the physical entities. In addition, polygonal tiles at lower levels in the hierarchical structure, such polygonal tiles referred to as child tiles, can be hierarchically linked to one or more polygonal tile at a higher level in the hierarchical structure, such polygonal tiles referred to as parent tiles.

Such cross-referencing between the physical entities in the indoor space combined with the hierarchical relationship between the polygonal tiles is referred to as spatial indexing for the purposes of the present subject matter. In other words, the grid so created using the hierarchical grid of polygonal tiles and the georeferenced physical entities serves is spatially indexed for representing the indoor space. Once spatially indexed, the grid can be used for generating a grid map of the indoor space and can be used for, amongst other things, providing one or more indoor-location based services based on localization of a mobile device in the indoor space. As an example, the grid map can be a representation of the indoor space, for instance, of the floor plan of the indoor space, in terms of the hierarchically arranged polygonal tiles forming the tessellated grid structure. The other associated aspects regarding fingerprint map generation and calibration for localization are not discussed herein in detail, but will be implemented along with the aspects of the present subject matter for the purposes of localization.

The polygonal tiles used for creating the grid may have various shapes and may be such that the polygonal tiles, when abutting together, can substantially fill the indoor space. In one example, the polygonal tiles may have a symmetrical polygonal shape, such as a symmetrical hexagonal shape. In another example, the polygonal tiles may have the same asymmetrical shape or have different symmetrical shapes. In yet another example, the polygonal tiles may be made of two or more different symmetrical shapes, in the same hierarchical level. In one more example, the polygonal tiles may be made of two or more different symmetrical shapes in different hierarchical levels. For instance, one hierarchical level can include a first set of polygonal tiles that are of a first symmetrical shape and another hierarchical level can include a second set of polygonal tiles that are of a symmetrical second shape, and a number of polygonal tiles in the lower hierarchical level are substantially contained in or cover a single polygonal tile of the set in the higher hierarchical level. For instance, the second set of tiles in the lower hierarchical level can be triangular tiles whereas the first set of tiles in the higher hierarchical level be hexagonal or rhombus-shaped. In addition, in the same example, in case the tiles in the lower hierarchical level are triangular, and the ones in the higher hierarchical level are rhombus-shaped, there may be a still higher hierarchical level which may have hexagonal tiles substantially containing within it the rhombus-shaped tiles as well as the triangular tiles of the lower hierarchical levels. Such interlinking of the polygonal tiles in different hierarchical levels can vastly enhance the flexibility with which the spatial indexing can be used in the present subject matter. For example, such a hierarchical structure can be embodied as a tree (or a tree-like) data structure, which kind of indexing of the data allows for an effective manner of retrieval of the information from a particularly large collection of data such as that used for localization.

In said examples, the polygonal tiles so tessellated can allow for effective operation in respect to the spatial indexing. The tessellation of the tiles can offer a densest packing for any lattice at any given hierarchical level. Therefore, from a localization perspective, such a polygonal tiling can provide a high degree of quantization for a given hierarchical level and a given area of the indoor space. In addition, the packing the polygonal tiles at each level is done in such a manner that no regions in the indoor space remain unmapped against the grid and, therefore, the effectiveness of the grid for localization is substantially high. Further, the tiles may also be used in a manner that the centroids of all the adjacent polygonal tiles are equidistant and, therefore, this may allow for smooth transitions between the polygonal tiles in all directions in an orderly manner.

In operation, for instance, for localization, the hierarchical structure of the grid can be used. The mobile device which is present in the indoor space for which the grid map as explained above has been prepared is localized using the techniques of the present subject matter. To start with, spatial data generated by the mobile device to be localized and present in the indoor space can be obtained. The spatial data of the mobile device can be compared with the set of georeferences for the indoor space and a polygonal tile in the size-wise hierarchy is identified which is indicative of a potential instantaneous location of the mobile device therein. Based on the potential instantaneous location, an indoor-location based service can be rendered to the mobile device.

The spatial data generated by the mobile device can be any information which can be indicative of an instantaneous location, for instance, a global or absolute location of the mobile device. Accordingly, as an example, the spatial data can include variations, temporal or otherwise, in sensor data obtained from the mobile device which can indicate the instantaneous location of the mobile device, say in an absolute or global manner. The term global or absolute location, as used herein, is used to indicate the location as determined on the basis of an absolute coordinate system, such as in respect of a global coordinate system. In other words, as an example, the spatial data may not be linked to the indoor space but is linked to the global coordinate system.

In said example, tessellating or tiling the hierarchical level or a plane in the grid may forms the basis of spatial indexing in accordance with the present subject matter which allows for appropriate representation of the indoor space, for instance, the geometry of the indoor space, and can be used to quickly access and process the spatial data. With such a tightly packed grid, traversing neighboring polygonal tiles for the purposes of search and localization can be performed quickly. For example, the exercise of comparing the spatial data can be smoothly performed without any interruptions because of the closely packed structure of the polygonal tiles. For example, in case of hexagonal tiles, the comparison can be done in a further structured manner, such as a "ring" of hexagonal tiles which gradually grows. Similarly, routing or navigation, which is essentially the successive traversal of adjacent polygonal tiles in the grid to reach a destination, can be done effectively within the tessellated grid. In addition, services such as, geofencing and targeted marketing can be naturally implemented with smooth transitions in various directions within the grid. Additionally, if for analytics, large amounts of data is to be retrieved from the mobile devices in the grid, the hexagonal tiles may be used effectively to aggregate the spatial data.

Further, the hierarchical grid structure of the present subject matter can allow different resolutions to be used within the hierarchical structure, for example, based on a given requirement. For example, a high resolution, i.e., at lower hierarchical level having small polygonal tiles, may be used when localizing a single mobile device, while a low resolution, i.e., at higher hierarchical levels having large polygonal tiles, may be more useful when aggregating, accessing, or processing a large set of spatial data for localization. Accordingly, during operation, a polygonal tile at certain hierarchical level in the size-wise hierarchy can be selected, the hierarchical level being different from the one at which the polygonal tile has been earlier identified, the identified polygonal tile, for instance, having the mobile device potentially located therein.

In addition, the provision of the hierarchical structure and the ability to change the resolution at which, for example, the localization is to be performed, also allows for efficient operation. For instance, to start with, the localization may start at a given hierarchical level, where the polygonal tile potentially containing the mobile device may be determined and, thereafter, a narrower region can be selected for localization. Therefore, for a subsequent-degree or step of identification, i.e., for the subsequent narrowing of the localization, one amongst the plurality of polygonal tiles contained within the identified polygonal tile can be selected. The process can be repeated for various subsequent-degrees or steps for further enhancing the resolution of the search, thereby enhancing the accuracy with which the exact location is localized. As will be understood, the accuracy of localization is directly related to the size of the polygonal tile at the selected level, i.e., the narrower or smaller the polygonal tile, greater may be the accuracy of localization, and greater may be the computational resources and time needed for localization. The selectivity of the hierarchical level allows the user to decide and obtain the localization, based on whether accuracy is paramount or the speed of localization. In another example, geofences can be implemented at various resolutions, thus saving processing time as well as memory for storing the associated spatial information. For instance, a geofence constituting of several hundred polygonal tiles in a high-resolution grid, may effectively be reduced to only a handful of polygonal tiles in a low-resolution grid. In one other example, Furthermore, different models of targeted marketing may be implemented at different hierarchical levels of the grid. For instance, at high resolution, diverse promotional marketing triggered at different spatial positions contained within the same region, such as a store can be implemented, while at lower resolution, key features or services which are targeted either at individuals or for a particular location can be implemented.

Moreover, resolution requirements may vary amongst different regions or environments in the indoor space, such as between open and congested space. For example, for the same indoor space, for a crowded space, such as a narrow hallway, a higher resolution of the grid can be selected, whereas for open spaces, a lower resolution of the grid can be selected. In other words, a different hierarchical level than that already selected for one region can be selected for another region of the indoor space from the hierarchical levels of the grid.

Although the hierarchical structure, as envisaged by the present subject matter, has been described with the polygons higher in the hierarchy having a bigger size and smaller-sized polygonal tiles at lower levels of the hierarchy, any other manner of correlating the shapes and sizes of the polygonal tiles in the multiple layers may be implemented. For example, the hierarchy may be inverted and, instead, a larger polygonal tile may be lower in the hierarchy with respect to the smaller polygonal tiles.

Also provided herein in a server device including a processor and a memory storing a set of computer instructions and a computing device including a processor and a memory. In both, the instructions are executable in the processor to render indoor-location based services as described above.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame. In other examples, other forms of coordinates, such as spherical coordinates or polar coordinates may be used for spatially indicating the locations, as envisaged in the present subject matter.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable mobile devices, and tablet mobile devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage mobile devices, such as hard drives on personal computers or servers. Other examples of computer storage mediums include portable memory storage units, flash memory (such as carried on smartphones, multifunctional mobile devices or tablets), and magnetic memory. Computers, terminals, network enabled mobile devices (e.g., mobile devices, such as cell phones) are all examples of machines and mobile devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a network environment 100 for localization of mobile devices 110-1, 110-2, . . . 110-N in an indoor space. The indoor space may include airports, malls, parking garages, warehouses, and any similar indoor facility. The mobile devices 110-1, 110-2, . . . 110-N may be collectively referred to as mobile devices 110 and individually as mobile device 110. The mobile device 110, one or more access points 120-1, 120-2, . . . 120-N, collectively referred to as access points 120 in the network environment 100, and a server computing device 130 may communicate over a communication network 140.

The communication network 140, in an example, may be a wireless communication network, such as, a telecommunication network, a cellular network, a wireless local area network (WLAN), a satellite communication-based network, a near field communication-based network, etc.

The server computing device 130, interchangeably referred to as server 130, may be a computing device, such as a cloud server or a remote server. The access points 120-1, 120-2, . . . 120-N, collectively referred to as access points 120 and individually referred to as access point 120, may be a computing device, which may provide for various mobile devices to connect to a network, such as a wired network of the communication network 140. The access points 120 may be spread across the indoor space to ensure that the indoor space is appropriately covered. In another example, the mobile device 110 may directly communicate with the server computing device 130 via the communication network 140. In operation, the server 130 can facilitate in the localization of the mobile device 110 based on, for example, a dynamically selectable level of granularity of representation of the indoor space. For the purposes, the server 130 can include a planner 160 and an indexer 170.

In an example, a mobile device controller 150 of the mobile device 110 may periodically or on receiving an input from the server computing device 130, hereinafter server 130, transmit corresponding localization data packet to the server 130. The localization data, among other things, may include localization data. The localization data may include location details, such as location coordinates in the pedestrian area or device data (signal and/or sensor) used for localization and/or location (x, y) coordinate information and floor number information, such as for a multi-floor building constituting the pedestrian area. Further, the localization data may also include a confidence level associated with the estimated location of the mobile device. In an example, the localization data packet may further be partitioned to include a preamble component having a company identifier or other identifier associated with either a proprietary or a standard formatting of the localization data packet, based upon which, for example, the information encoded in localization data packet may be correctly decoded into specific (x, y, z) coordinates to establish a position of mobile device 110 as localized within the pedestrian area. The position of the mobile device 110, i.e., localization, may be estimated either by the mobile device 110 itself, for instance, by the mobile device controller 150. In other examples, other forms of coordinates, such as spherical coordinates or polar coordinates may be used for spatially indicating the locations, as envisaged in the present subject matter.

In one embodiment, the mobile device 110 may cooperate with the server 130 and carry out localization of the mobile device 110, i.e., itself, by selecting a level of granularity of representation of the indoor space. The mobile device 110 may be a cellular or smartphone, a laptop or a tablet computer, or a wearable computer mobile device that may be operational for any one or more of telephony, data communication, and data computing. As mentioned above, the mobile device 110 may include fingerprint data of the indoor space, such as an indoor facility and proximate pedestrian section stored in a local memory. In some examples, the mobile device 110, may download the fingerprint data from the server computing device 130, which may make the fingerprint data accessible to the mobile device 110 for download into the local memory of mobile device 110. The fingerprint data along with mobile device data (sensor data and/or signal data) obtained by the mobile device 110 may be used for localization.

The mobile device 110 may include sensor functionality by way of sensor mobile devices. The sensor mobile devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. In another example, the server 130 may have the location determination capability and a communication interface for communicatively coupling to communication network 140. In an example, a localizer 180 of the mobile device 110 may, periodically or on receiving an input from the server computing device 130, localize the mobile device 110, and the indoor location-based service (ILBS) provider 190 can render location-based services to the mobile device 110.

The localizer 180, constituted of logic instructions executable in a processor of the mobile device 110 in one embodiment, may be hosted at the mobile device 110 and provides, at least in part, capability for system localizing the mobile device 110 along a pedestrian route traversed in an indoor space. In alternate embodiments, one or more portions constituting the localizer 180 may be hosted remotely at a server device, such as the server 130, and made communicatively accessible to mobile device 110 via communication network 140. Similarly, the planner 160 and the indexer 170, constituted of logic instructions executable in a processor of the server 130, may in other embodiments be partially or completely hosted in the mobile device 110.

Thus, the provision of dynamically selectable level of granularity of indoor space representation as well as the selection of the granularity, on-the-fly or otherwise, for may be done by the mobile device 110 entirely or by the server 130 entirely, or, as explained above, partly by the mobile device 110 and partly by the server 130.

In operation, the localization based on the dynamically selectable level of granularity may be performed two phases. The first phase is referred to as a preparatory phase in which the server 130 prepares for allowing the representation of the indoor space being such that its level of granularity is selectable, and the second phase is referred to as an executory phase in which the mobile device 110 (or the server 130, collectively referred to as computing device) performs the localization based on a selected level of granularity. As mentioned above, in other examples, the preparatory phase as well as the executory phase may be performed by a single mobile device, i.e., either the mobile device 110 or the server 130.

In the preparatory phase, the planner 160 and the indexer 170 of the server 130 can cooperatively prepare a grid map of the indoor space, which can be then used for providing indoor location-based services to the mobile device 110. Accordingly, the planner 160 can identify various physical entities that are present in the indoor space. The physical entities can include, for example, walls, passages, hallways, elevator shafts, escalators, open spaces, doorways, hallway, kiosks, stores, alleys, holes, café, and salon. In other words, the physical entities can be any meaningful label that can be associated with the polygonal tile by way of the correlation therebetween. In addition, the planner 160 can also identify the absolute or global position of the physical entities using a coordinate system, and is referred to as georeferencing the physical entities in the indoor space. As mentioned earlier, as an example, the global or local location is used to indicate the location as determined on the basis of a global or local coordinate system. In said example, the georeference can be any information which can be used to determine the location of the physical entity.

Subsequently, the planner 160 can divide the indoor space into a grid of tessellated polygonal tiles, i.e., polygonal tiles abutting adjacent polygonal tiles. In addition, planner 160 can generate the grid as a multi-layered, hierarchical structure of such polygonal tiles, where the polygonal tiles in each level or layer of the hierarchical structure bear a relationship with the polygonal tiles in the level above and below that level. Accordingly, the planner 160 can generate the polygonal tiles in each level to be so sized and shaped that a polygonal tile higher in the hierarchical structure substantially covers a plurality of smaller polygonal tiles lower in the hierarchical structure.

In addition, the indexer 170 can spatially index the grid by correlating the georeferenced physical entities with the polygonal tiles in the different hierarchical levels in the grid. In other words, the indexer 170 can correlate or cross-reference the physical entities and the polygonal tiles in various layers of the hierarchical structure, such the georeference of each physical entity is mapped with the corresponding polygonal tile in each hierarchical level. The indexer 170 can, thus, represent the indoor space by spatially indexing the grid using the hierarchical structure of the polygonal tiles and the georeferenced physical entities. Once the spatial indexing is done, the indexer 170 can use the grid for generating the grid map of the indoor space for use in the executory phase.

In the executory phase, as an example, the localizer 180 of the mobile device 110 can use the grid map generated by the indexer 170 above for, amongst other things, providing one or more indoor-location based services by localizing the mobile device 110 in the indoor space. For the purpose, for instance, the localizer 180 can localize the mobile device 110 present in the indoor space for which the grid map, as explained above has been prepared. The localizer 180 can obtain the spatial data generated by the mobile device 110 when the request for localization or a request for ILBS, or both, is received. As an example, the spatial data generated by the mobile device 110 can be information indicative of an instantaneous location, for instance, a global or absolute location of the mobile device. Accordingly, as an example, the spatial data can include variations, temporal or otherwise, in sensor data obtained from the mobile device which can indicate the instantaneous location of the mobile device. The localizer 180 can compare the spatial data of the mobile device 110 with the set of georeferences for the indoor space, and identify a polygonal tile in the size-wise hierarchy in which the mobile device 110 can be potentially instantaneously located. Based on the potential instantaneous location, the ILBS provider 190 can render an indoor-location based service to the mobile device 110.

According to the aspect explained above, the localizer 180 may be enabled to select, dynamically, i.e., at the time of performing the localization, or otherwise, the level of granularity at which the localization is to be performed. In other words, the localizer 180 can select the hierarchical level in the grid for localization, based on whether to determine a pin-pointed location of the mobile device 110 or to determine the general region in which the mobile device 110 is located. For example, the localizer 180 may select a high resolution or low level of granularity, i.e., localization at lower hierarchical level having small polygonal tiles, when localizing a single mobile device. On the other hand, the localizer 180 can select a low resolution or a high level of granularity, i.e., localization at higher hierarchical levels having large polygonal tiles, when aggregating, accessing, or processing a large set of spatial data for localization and when the exact location may not be required and a general region in which the mobile device 110 is located is sufficient.

Figure 2:
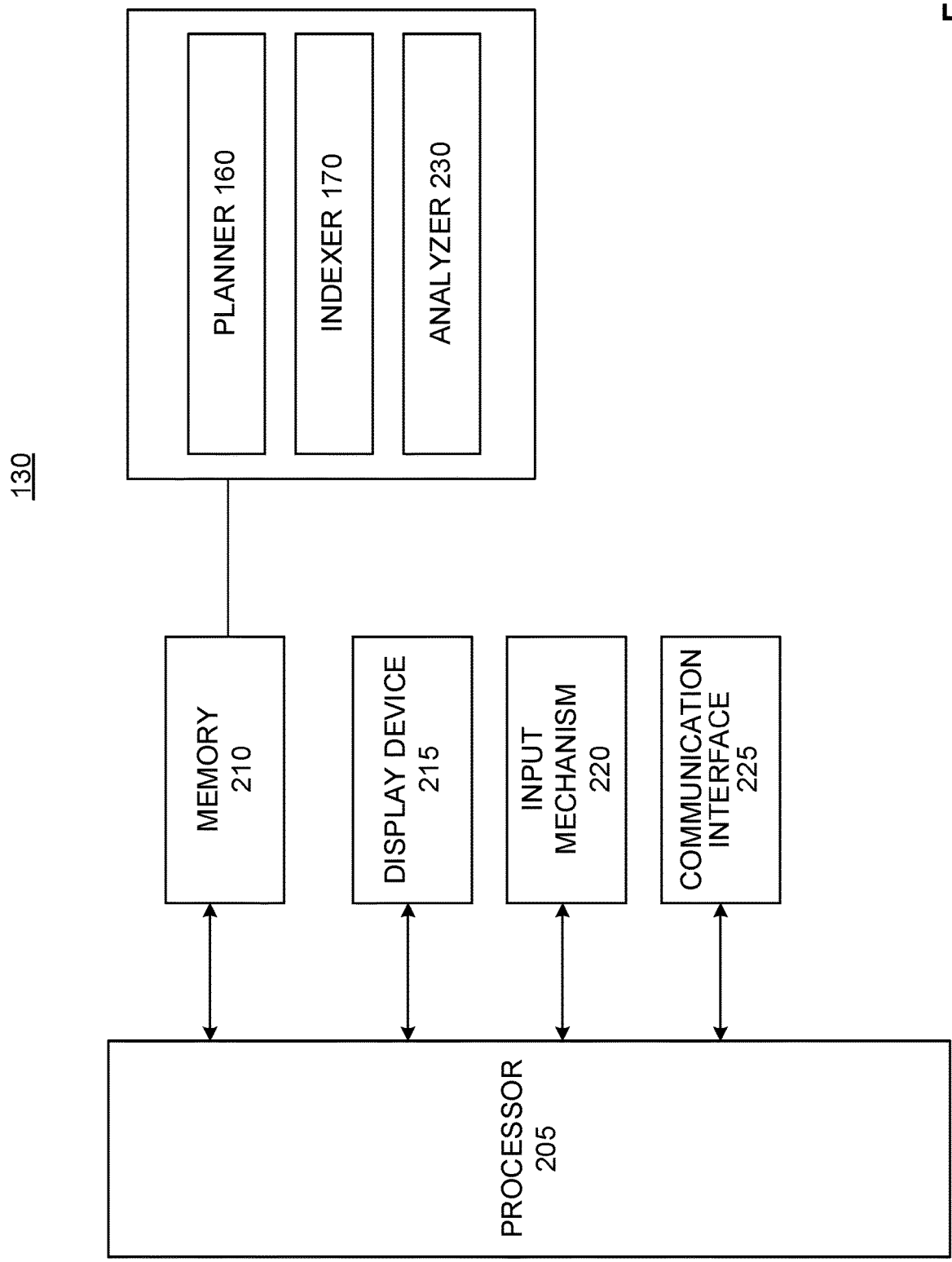
FIG. 2 illustrates, as an example, an architecture of a computer server for localizing mobile devices in an indoor space based on selection of spatial-resolution.

FIG. 2 illustrates an example architecture of the server 130 for facilitating localization using a tessellated grid. In an example, the provision of the tessellated grid with a hierarchical structure, as explained above, may allow selection of the level of granularity for the localization. In an example, the server 130 provides for the generation of a tessellated hierarchical grid which is used to represent the indoor space and, in which, the hierarchical level, which indicates the level of granularity of the localization, is selectable. The server 130, in an embodiment architecture, may be implemented on one or more server devices, and includes a processor 205, memory 210 which may include a read-only memory (ROM) as well as a random access memory (RAM) or other dynamic storage device, display device 215, input mechanisms 220 and communication interface 225 for communicative coupling to communication network 140. The processor 205 is configured with software and/or other logic (such as the planner 160 and the indexer 170) to perform one or more processes, steps and other functions described with implementations, such as described by FIGS. 1, 3, and 4 herein. The processor 205 may process information and instructions stored in the memory 210, such as provided by a random-access memory (RAM) or other dynamic storage device, for storing information and instructions which are executable by the processor 205. The memory 210 also may be used for storing temporary variables or other intermediate information during execution of instructions to be executed by the processor 205. The memory 210 may also include the ROM or other static storage device for storing static information and instructions for processor 205; a storage device, such as a magnetic disk or optical disk, may be provided for storing information and instructions. Communication interface 225 enables the server 130 to communicate with one or more communication networks, such as the network 140 (e.g., cellular network) through use of the network link (wireless or wired). Using the network link, the server 130 can communicate with mobile devices 110.

The server 130, among other components, may include the planner 160, the indexer 170, and the analyzer 230. The planner 160, the indexer 170, and the analyzer 230 may include processor-executable instructions stored in RAM, in one embodiment, in the memory 210 and may include sub-modules for carrying out various operations and functions.

As explained previously, the planner 160 and the indexer 170 cooperate with each other to generate the grid map which is further supplemented and processed for use for localization of the mobile device 110. The localization is enabled by allowing selection of the level of granularity at which the localization is to be performed. The representation of the indoor space by a hierarchical grid structure allows a user to select at which hierarchical level, and therefore, at what resolution or level of granularity is the localization of the mobile device 110 to be performed. As an example, the selection of the resolution can allow for selecting a precision-level with which the localization of the mobile device 110 is performed.

As part of the generation of the grid map, the planner 160 can represent the indoor space as a grid having multiple planes arranged in a stack. As an example, the planner 160 may obtain the floor plan of the indoor space in any raster format, and begin by dividing the floor plan into a plurality of polygonal tiles, shown as an example in FIG. 2.1, and overlay the floor plan with the stacked planes. Each plane is made of tessellated polygonal tiles, i.e., polygonal tiles abutting adjacent polygonal tiles and the multi-planar structure forms a hierarchically-related structure of such polygonal tiles in which the polygonal tiles in one plane of the hierarchical structure bear a relationship with the polygonal tiles in the plane above and below that plane. Such planes, also referred to as the hierarchical levels of the grid, contain the polygonal tiles which form the basic building block of the representation which is used to depict the indoor space. The planner 160 can generate the polygonal tiles in each hierarchical level to be so sized and shaped that a polygonal tile higher in the hierarchical level can be, with certain approximation, represented by a collection of polygonal tiles in at least one lower hierarchical level, whether immediately adjacent to the hierarchical level or not. For instance, a polygonal tile higher in the hierarchical structure can contain within it a plurality of smaller polygonal tiles that are lower in the hierarchical structure. As an example, the indoor space represented as the hierarchical grid of multi-layered polygons of different sizes is shown in FIG. 2.2. In the example shown, the grid may be made of two-dimensional layers of polygonal tiles. In other examples, however, the hierarchical grid may be a three-dimensional grid involving three-dimensional volumes which are binned for carrying out the operation as envisaged by the present subject matter.

The planner 160 may use polygonal tiles of various shapes and sizes for creating the grid. In one example, planner 160 may use symmetrical polygonal-shaped tiles, such as a hexagonal tile, for creating the grid. In another example, planner 160 may use the polygonal tiles that have the same asymmetrical shape or have different symmetrical shapes. For instance, the planner 160 may use differently sized triangles to cover the entire indoor space, represented by a hierarchical level in the grid. In yet another example, the planner 160 may use polygonal tiles made of two or more different symmetrical shapes, in the same hierarchical level as part of representing the indoor space using the grid.

In one other example, the planner 160 may use polygonal tiles made of two or more different symmetrical shapes in different hierarchical levels. The planner 160 may make one hierarchical level using a first set of polygonal tiles that are of a first symmetrical shape and make another hierarchical level using a second set of polygonal tiles that are of a symmetrical second shape, with the polygonal tiles in the lower hierarchical level and the higher hierarchical level bearing a genus-species relationship with each other. For instance, the planner 160 can use symmetric triangular tiles in the lower hierarchical level and use rhombus-shaped tiles in the higher hierarchical level. In addition, in the same example, in case the tiles in the lower hierarchical level are triangular, and the ones in the higher hierarchical level are rhombus-shaped, the planner 160 may use hexagonal tiles in a still higher hierarchical level which may substantially contain within it the rhombus-shaped tiles as well as the triangular tiles of the lower hierarchical levels.

In said examples, the polygonal tiles having a symmetrical shape can allow for effective operation in respect to the spatial indexing. For instance, the symmetrical hexagon-shaped polygonal tiles, whether formed as a complete hexagonal tile or by the combination of other symmetrical or asymmetrical polygonal tiles, can offer the densest packing for any lattice at any given hierarchical level and can, therefore, provide a high degree of quantization for a given hierarchical level and a given area of the indoor space. This means that the hexagonal tile can be selected at a high resolution which, in turn, can accurately localize the mobile device 110. In addition, the hexagonal tiles allow for packing such that no regions in the indoor space remain unmapped. Therefore, the natural asymmetry in a hexagonal tile can provide high accuracy and a smooth approximation of the curves contained in the tiles. In addition, the centroids of all the adjacent polygonal tiles are equidistant and, therefore, this can allow for smooth transitions between the polygonal tiles in all directions in an orderly manner.

Further, the indexer 170 can achieve the spatial indexing of the grid by correlating the physical entities and the polygonal tiles in various layers of the hierarchical structure, such that the georeference of each physical entity is mapped with the corresponding polygonal tile in each hierarchical level. The georeference of the physical entity, correlated with the polygonal tile, can be any information which can be used to indicate the position or location of the physical entity or the polygonal tile(s) associated therewith. In one example, as part of georeferencing, the indexer 170 may use global or absolute coordinates, such as geographical coordinates in the form of longitudinal and latitudinal information, to indicate the location of the physical entities. In other examples, the indexer 170 may use a local coordinate system, for instance, associated with the indoor space, for georeferencing the physical entities. In still other examples, the indexer 170 may use any other manner of indicating the location of the physical entities, for example, without using a coordinate system.

The indexer 170 can, thus, represent the indoor space by spatially indexing the grid using the hierarchical structure of the polygonal tiles and the georeferenced physical entities. The indexer 170, in the present example, can interlink the polygonal tiles in different hierarchical levels to enhance the flexibility with which the spatial indexing implemented. For example, with such a spatial indexing, the indexer 170 can create a tree (or a tree-like) hierarchical structure, which allows for an effective manner of retrieval of the information from a particularly large collection of data such as that used for localization. In other words, in said example, as part of the spatial indexing performed, each child polygonal tile can be hierarchically linked to the parent polygonal tile at a higher level in the hierarchical structure so as to spatially index the grid into a tree-like hierarchical structure.

As an example, the spatial data, used for the georeferencing in said example, can include variations, temporal or otherwise, in sensor data obtained from the mobile device which can indicate the instantaneous location of the mobile device. In said example embodiments, the sensor data can include mobile device wireless signal data including signal strength and connectivity, inertial data, barometric data, magnetic data and other mobile device data that may be gathered at positions along a trajectory of motion. In addition, the sensor data may include Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data. The sensor data, as described above, may all be useable as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion. Estimating a trajectory of the mobile device in accordance with the data fusion may be based on the wireless signal data, inertial data, barometric data, magnetic data and other mobile device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data. Accordingly, in an example, the sensor data may include a first set of sensor data signals acquired by the mobile device 110 and a second set of sensor data generated by the mobile device 110. For instance, the data from the inertial sensors can be the sensor data generated by the mobile device 110 and the part of the data from the signal sensors can be the sensor data acquired by the mobile device 110 while part of the signal data may be generated by the mobile device 110 itself.

As an example, as part of spatial indexing the grid, an identifier can be associated with each of the polygonal tiles in the hierarchical structure and the identifier can have the georeference embedded therein. In other words, the identifier may be used to signify the association of the polygonal tile with physical entities on the floor map. For instance, the identifier may be a number, a tuple, a label, or of any format that allows re-constructing the corresponding polygonal tile with little or no error. The georeferenced information may be embedded, directly or indirectly, into the identifier itself by, for example, passing the georeferenced data (processed or raw) through a function to generate the identifier, such that when the function is inverted and applied to the identifier, the actual georeferenced data may be retrieved therefrom. In another example, possibility involves implementing an identifier allocation scheme that the parameters associated with the polygonal tile, such as orientation, size, and neighboring polygonal tiles, and the actual georeference, can be used for interpreting the georeferenced data associated with the polygonal tile. This may provide a way of efficiently storing the spatial indexing information associated with the grid as well as for retrieving that information from, for example, a memory location, thereby translating into a quick and efficient operation.

By way of spatial indexing as explained above, the server 130 may perform calibration of the indoor space for generating a fingerprint map which can be further used for localization. In order to build a fingerprint repository for indoor positioning applications, the server may collect the spatial data (referred to as reference data) at known locations, i.e., for each of the georeferenced polygonal tile in the various hierarchical levels in the grid. The calibration is performed by collecting the spatial data using a data collection device, such as a mobile phone, in the various polygonal tiles in the grid to collect data. As mentioned previously, depending on whether a high spatial resolution of the data is required or a low spatial resolution is required, the hierarchical level with which the fingerprint data is associated can be selected, which in turn, can be used to make an educated choice between efficiency of acquiring the data and the accuracy with which the data can perform localization.

As a consequence of the calibration by the server 130, in an example, the server 130 may also include a fingerprint data repository (not shown in figures), which may be communicatively accessible to mobile device 110, via the network 140. In alternate embodiments, the fingerprint data repository, or any portion(s) thereof, may be stored in a memory of mobile device 110.

The terms fingerprint and fingerprint data as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. Once a particular as-measured value, a pattern or signature based on any one or more of received wireless communication signal strength and signal connectivity parameters, magnetic field parameters or barometric pressure parameters, and mobile device inertial sensor data is detected or recorded by the mobile device 110, the value or pattern as detected may be matched to a reference fingerprint stored in a fingerprint map of a given facility, for example as stored in positioning fingerprint data repository, to identify the unique position of the mobile device relative to the facility, a process also referred to herein as localization.

A sequence of positions or locations that constitute a navigation path traversed by mobile device 110 relative to the pedestrian area may be mapped for fingerprint data during a fingerprint calibration process. In some embodiments, given that sampling times and sampling rates applied in conjunction with particular mobile device sensors may be different, the signal and sensor information as measured during a fingerprint calibration process may be aggregated and fused, for example, time-averaged, across particular periods of time, with the aggregated and fused value being used to represent the signal information at any given instance of time within that particular period of time in which the signal information is aggregated and fused. The fingerprint data may be used to track the mobile device 110 traversal along an indoor route within, and even adjoining, the pedestrian area. As will be understood, the data collection as well as the association, for calibration and fingerprint generation integrated with the spatial indexing, is performed in the context of the tessellated, hierarchical grid generated by the planner 160 and the indexer 170, as discussed previously.

The calibrated fingerprint data, integrated with the georeferences of the various physical entities, obtained by the server 130 in combination with the hierarchical grid forms the grid map-representation of the indoor space which can be further used for localizing the mobile device 110 to render ILBS to the mobile device 110, as has been explained earlier and is explained in further detail below.

Figure 3:
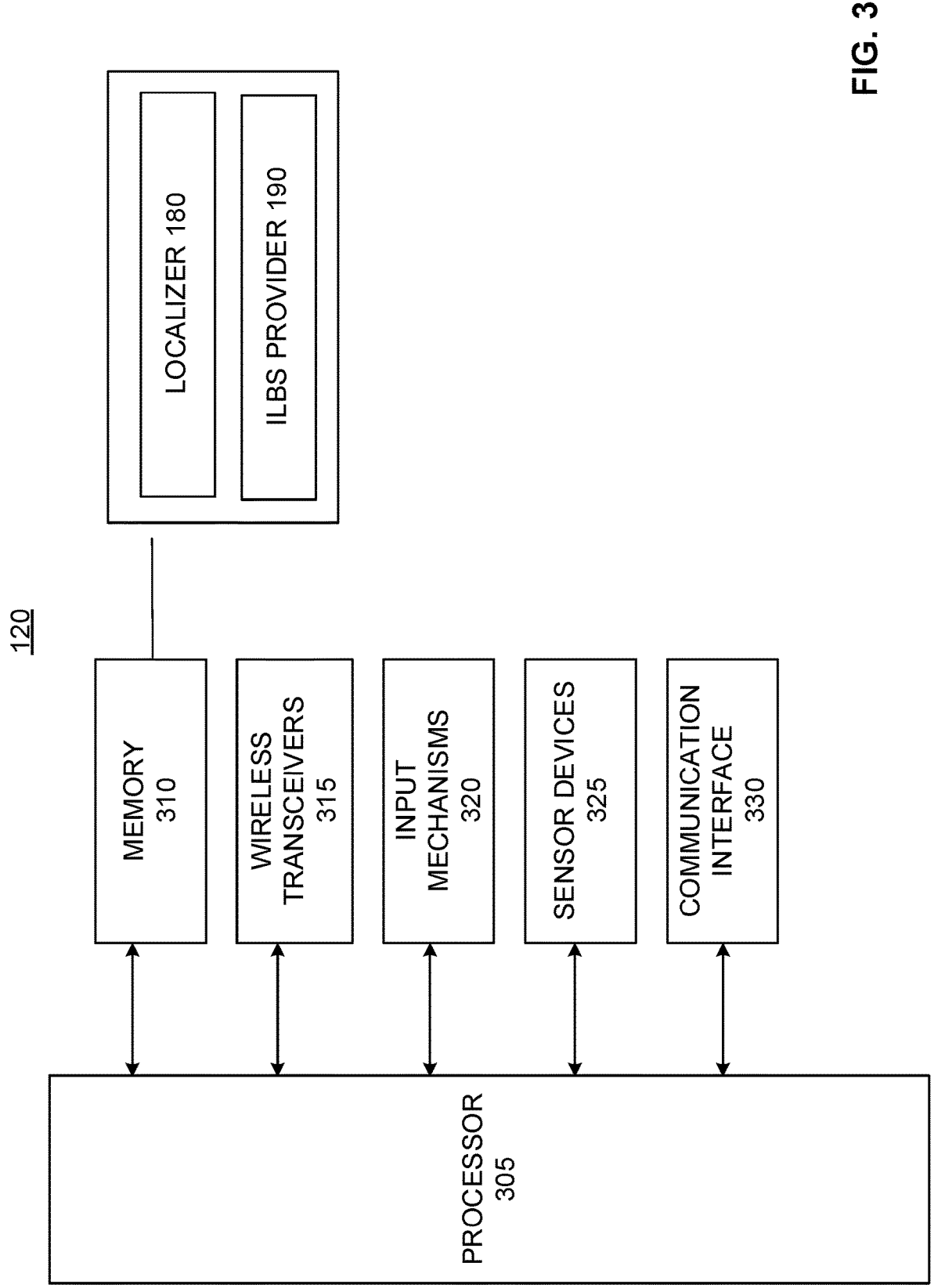
FIG. 3 illustrates, as an example, an architecture of a mobile device for localizing in an indoor space based on selection of spatial-resolution.

FIG. 3 illustrates an example architecture of the mobile device 110 capable of localizing itself using the hierarchical grid and the associated capabilities as discussed above. The mobile device 110, in an embodiment architecture, may be implemented on one or more server devices, and includes a processor 305, memory 310 which may include a read-only memory (ROM) as well as a random access memory (RAM) or other dynamic storage mobile device, display mobile device 315, input mechanisms 320 and communication interface 330 for communicative coupling to communication network 140. The processor 305 is configured with software and/or other logic (such as the localizer 180 and the ILBS provider 190) to perform one or more processes, steps and other functions described with implementations, such as described by FIGS. 1, 3, and 5 herein. The processor 305 may process information and instructions stored in the memory 310, such as provided by a random-access memory (RAM) or other dynamic storage mobile device, for storing information and instructions which are executable by the processor 305. The memory 310 also may be used for storing temporary variables or other intermediate information during execution of instructions to be executed by the processor 305. The memory 310 may also include the ROM or other static storage mobile device for storing static information and instructions for processor 305; a storage mobile device, such as a magnetic disk or optical disk, may be provided for storing information and instructions. Communication interface 330 enables the server 130 to communicate with one or more communication networks, such as the communication network 140 (e.g., cellular network) through use of the network link (wireless or wired). Using the network link, the mobile device 110 can communicate with the server 130 and various other mobile devices 110 and other mobile devices, such as the access point 120.

The mobile device 110, among other components, may include sensor devices 325, communication interface 330, the localizer 180, the ILBS provider 190. The sensor mobile devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. The mobile device 110 may also include capability for detecting and communicatively accessing ambient wireless communication signals including but not limited to any of Bluetooth® and Bluetooth Low Energy (BLE), Wi-Fi, RFID, or satellite-based navigations signals including global positioning system (GPS) signals. The mobile device 110 further includes the capability for detecting, via sensor mobile devices, and measuring wireless signal parameters, which may include wireless signal parameters related to the ambient wireless signals, such as channel state information (CSI) related parameters, or received signal strength (RSS) or any other parameter that can be used for localization of the mobile device 110. In another example, the server 130 may have the localization capability and a communication interface for communicatively coupling to communication network 140.

The communication interface 330 enables the mobile device 110 to communicate with one or more communication networks, such as the network 140 (e.g., cellular network) through use of the network link (wireless or wired). Using the network link, mobile device 110 can communicate with the server 130.

In an example, the localizer 180 of the mobile device 110 may, periodically or on receiving an input, localize the mobile device 110. In said example, the localizer 180 can receive the inputs from the server 130. The localizer 180 and the ILBS provider 190 may include processor-executable instructions stored in RAM, in one embodiment, in the memory 310 and may include sub-modules. In an example, the mobile device 110 may also be communicatively coupled to a fingerprint data repository (not shown in figures), which may reside at or be communicatively coupled to the server 130, via the communication network 140. In alternate embodiments, the fingerprint data repository, or any portion(s) thereof, may be stored in a memory of mobile device 110.

In an example, a fingerprint data repository, or any portion(s) thereof, may be stored in remote computing server device (not shown), and made communicatively accessible to mobile device 110 via communication network 140. In some embodiments, it is contemplated that the fingerprint data repository, or any portions of data and processor-executable instructions constituting the fingerprint data repository, may be downloaded for storage, at least temporarily, within a memory of the mobile device 110. In embodiments, the fingerprint map data stored in the fingerprint data repository further associates particular positions along pedestrian route of the facility or indoor area with any combination of fingerprint data, including gyroscope data, accelerometer data, wireless signal strength data, wireless connectivity data, magnetic data, barometric data, acoustic data, line-of sight data, and ambient lighting data stored thereon.

In operation, explained above, there may be two phases of operation—the preparatory phase and the executory phase. As an example, in the preparatory phase, the server 130 may operate and the mobile device 110 may operate in the executory phase in which the mobile device 110 performs the localization, based on the operation done by the server 130 in the preparatory phase.

For the purposes of localization, the localizer 180 of the mobile device 110 can use the grid map containing the grid and the correlated georeferences as well as the calibrated fingerprint data, amongst other things, for providing one or more indoor-location based services by localizing the mobile device 110 in the indoor space. Further, the localizer 180 can obtain the spatial data generated by the mobile device 110 when the request for localization or a request for ILBS, or both, is received. As an example, as mentioned earlier, the spatial data generated by the mobile device 110 can be information indicative of an instantaneous location, for instance, a global or absolute location of the mobile device.

Accordingly, as an example, the spatial data can include variations, temporal or otherwise, in sensor data obtained from the mobile device which can indicate the instantaneous location of the mobile device. In said example embodiments, the sensor data can include mobile device wireless signal data including signal strength and connectivity, inertial data, barometric data, magnetic data and other mobile device data may be gathered at positions along a trajectory of motion and Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data, which may all be used as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion. Estimating a trajectory of the mobile device in accordance with the data fusion may be based on the wireless signal data, inertial data, barometric data, magnetic data and other mobile device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data. Accordingly, in an example, the sensor data may include a first set of sensor data signals acquired by the mobile device 110 and a second set of sensor data generated by the mobile device 110. For instance, the data from the inertial sensors can be the sensor data generated by the mobile device 110 and the part of the data from the signal sensors can be the sensor data acquired by the mobile device 110 while part of the signal data may be generated by the mobile device 110 itself.

As an example, the instantaneous location may refer to a coordinate location, and may be expressed in local or global (X, Y) coordinate terms. In some embodiments, the coordinates may further include a Z coordinate representing a height, for example associated with a given floor within a multi-floor building, and thus expressed in (X, Y, Z) coordinate terms. In other examples, other forms of coordinates, such as spherical coordinates or polar coordinates may be used for spatially indicating the locations, as envisaged in the present subject matter. Similar manner of representation of location may be used for indicating the localized position of the mobile device 110.

The localizer 180 can compare the spatial data of the mobile device 110 with the set of georeferences for the indoor space, and identify a polygonal tile in the size-wise hierarchy in which the mobile device 110 can be potentially instantaneously located. Based on the potential instantaneous location, the ILBS provider 190 can render an indoor-location based service to the mobile device 110. The set of georeferences, as explained earlier, can include not only the local or global location of the polygonal tile in the hierarchical grid structure, but also variations in sensor data, for instance, the spatial data. Accordingly, the georeferences may be understood as, say geo-coordinates, cross-referenced with the spatial data, i.e., the calibrated fingerprint data, as well as the physical entities/polygonal tiles. Therefore, when the georeferences are compared against the spatial data generated by the mobile device 110 in real-time (for localization), the results directly indicate the polygonal tile in which the mobile device 110 is potentially instantaneously located.

According to the aspect explained above, the localizer 180 may be enabled to select, dynamically, i.e., at the time of performing the localization, or otherwise, the level of granularity at which the localization is to be performed. In other words, the localizer 180 can select whether to determine a pin-pointed location of the mobile device 110 or to determine the general region in which the mobile device 110 is located. For example, the localizer 180 may select a high resolution or low level of granularity, i.e., localization at lower hierarchical level having small polygonal tiles, when localizing a single mobile device. On the other hand, the localizer 180 can select a low resolution or a high level of granularity, i.e., localization at higher hierarchical levels having large polygonal tiles, when aggregating, accessing, or processing a large set of spatial data for localization and when the exact location may not be required and a general region in which the mobile device 110 is located is sufficient.

Accordingly, as an example, consider that the localizer 180, initially, selects a certain level in the hierarchy for localization and the polygonal tile in which the mobile device 110 may be potentially located may be determined, in the manner as explained above. Thereafter, for the same mobile device 110, the localizer 180 may be able to select a different hierarchical level, for example, to narrow the search area in which the mobile device 110 is to be localized so as to be able to more accurately localize the mobile device 110. Accordingly, in said example, the localizer 180 may select a lower level in the hierarchical structure. Subsequently, the localizer 180 may select a further lower level in the hierarchical structure to further narrow the region to be assessed for localization, and this may be repeated until a required balance between accuracy of the localization and the time required therefor is not balanced, for instance, based on a user preference. For instance, the user may provide input as to whether the constraint to be applied for stopping at a certain level is time or accuracy. This may also provide for an efficient manner of localization as the narrowing of the region happens in a step-wise manner and the region not to be searched is eliminated at every step. The region that is not to be searched ultimately may culminate into the conservation of time and computational resources of the mobile device 110.

Moreover, the localizer 180 may also be enabled to select a different hierarchical level for another region of the indoor space than that already selected for one region of the indoor space, for example, as the mobile device 110 moves within the indoor space and the localizer 180 attempts to localize the mobile device 110. For instance, the localizer 180 may be configured to select different resolutions in different regions of the indoor space given the resolution requirements that may vary amongst different regions or environments in the indoor space. For example, in case of a crowded space, such as a narrow hallway, the localizer 180 may select a higher resolution of the grid such that the speed of localization remains substantially unaffected even with a greater amount of spatial data being processed upon such a selection. In case of an open spaces, in contrast, the localizer 180 select a lower resolution of the grid since a large amount of data may have to be processed and a high resolution may involve expenditure of considerable time and processing resources.

Further, as an example, in the time-constrained applications, such as localization, to achieve rapid processing of spatial, as part of the comparison between the spatial data and the georeferences explained above, the localizer may seek to map the spatial data generated by the mobile device 110 to one or more polygonal tiles in the grid structure. This mapping is achieved by associating the spatial data of the mobile device 110 with the identifier of the polygonal tile generated at the time of spatial indexing.

Subsequently, based on the localization, the ILBS provider 190 can render the location-based services to the mobile device 110, based on the polygonal tile identified by the localizer 180, as explained above. In the above example, once the spatial data and the identifier have been linked, the localization of the mobile device 110 automatically may link the mobile device 110 to the physical entities in the polygonal tile that has been identified as the potential instantaneous location of the mobile device 110. Such linking may, in other examples, be performed by the ILBS provider 190. As part of ILBS, the ILBS provider 190 may suggest amenities, stores, services, or offers available in the vicinity of the mobile device 110, allow searching for such amenities, stores, services, or offers, and generate routes for navigating the mobile device 110 through the indoor to places of interest or to a user-defined destination.

The provision of selecting the resolution or the hierarchical level in the grid for which the localization is to be done, is also provided for the indoor location-based service rendering. Based on the selection of the level of granularity by the ILBS provider 190, the services can be rendered at that resolution. For example, the ILBS provider 190 can implement geofences at various resolutions, where a geofence constituting of several hundred polygonal tiles in a high-resolution grid, may effectively be reduced to a handful of polygonal tiles in a low-resolution grid, depending, for instance, on the type of ILBS that is being rendered. Furthermore, the ILBS provider 190 may implement different models of targeted marketing implemented at different hierarchical levels of the grid. For instance, at high resolution, the ILBS provider 190 may implement diverse promotional marketing triggered at different spatial positions contained within the same region, such as a store, while at lower resolution, the ILBS key features or services which are targeted either at individuals or for a particular location can be implemented. Therefore, the selection of the resolution for rendering the ILBS to the mobile device 110 can allow for rendering tailored services to the mobile device in the indoor space.

As explained earlier, as an example, the preparatory phase may be performed outside the mobile device 110 by the server 130, for instance, as part of calibration. In said embodiment, few pre-calculations can be performed on the server side and stored into efficient data structures, either at the server 130 or the mobile device 110, so that a minimalistic set of data is created which is readily available when needed by the mobile device, whether obtained from the server 130 or stored locally, to determine its own position in real-time. In few other embodiments still, the server 130 can initialize localization operation at its end and all the processing for localization can be performed entirely at the server 130.

In addition, the server 130 or the mobile device 110 or the two in combination may also be able to use the grid for capturing spatial data for the purposes of, for example, analytics. Accordingly, the analyzer 230, shown as part of the server 130 as an example, can cooperate with the mobile device 110 to linking the spatial data generated by the mobile device with the discrete polygonal tile at each hierarchical level of the size-wise hierarchy and then aggregating the spatial data. The aggregation of the data can either for the entire grid, i.e., for all the hierarchical level, or it may be done for a selected hierarchical level in the size-wise hierarchy. The latter, as will be understood, may allow for an efficient manner of aggregation of data, based on a requirement of the granularity with which the data must be aggregated and then processed for deriving intelligible information therefrom. For instance, the purpose of the aggregation of the spatial data can be to develop insights based on a predefined metric. The spatially indexed hierarchical grid can be used to derive, in a selective and conscious manner, raw spatial data (or a derived representative set) compiled from a multitude of users which can act as georeferenced analytics data for the indoor space.

Based on the association between the polygonal tiles (i.e., the identifiers of the polygonal tiles) to the georeferenced grid map of the indoor space, the polygonal tiles can be linked to the analytics data, thereby providing insightful information regarding the selected polygonal tiles. For example, macro-level insight into the efficacy of the indoor environment can be obtained by processing the spatial data to produce viable metric indicating either a single outcome or a set of outcomes, which can be illustrated using visual aids, for example.

Methodology

FIG. 4 illustrates, as an example, a method 400 of localizing a mobile device in an indoor space, for example, by representing the indoor space using a tessellated grid. In describing examples of FIG. 4, reference is made to the examples of FIGS. 1-3 for purposes of illustrating suitable components or elements for performing a step or sub-step being described. For the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 4 examples of method steps described herein are related to a server, such as the server 130, to facilitate spatial-resolution selection for localization of mobile devices, such as mobile device 110. According to one embodiment, the techniques are performed by the processor 205 executing one or more sequences of software logic instructions that constitute the planner 160 and the indexer 170 of the server 130. In embodiments, planner 160 and the indexer 170 may include the one or more sequences of instructions within sub-modules. Such instructions may be read into the memory 210 from machine-readable medium, such as memory storage mobile devices. Execution of the sequences of instructions contained in the planner 160 and the indexer 170 in the memory 210 causes the processor 205 to perform the process steps described herein. It is contemplated that, in some implementations, some of the sub-modules, or any other portions of executable instructions constituting the planner 160 and the indexer 170 may be hosted at a remote device other than at the server 130. In alternative implementations, at least some hard-wired circuitry may be used in place of, or in combination with, the software logic instructions to implement examples described herein. Thus, the examples described herein are not limited to any particular combination of hardware circuitry and software instructions. Further, in other embodiments, the method 400 may be implemented in its entirety or at least partially using the mobile device 110.

At block 410, various physical entities that are present in the indoor space are identified. The physical entities can include, for example, walls, passages, hallways, elevator shafts, escalators, open spaces, doorways, hallway, kiosks, stores, alleys, holes, café, and salon. In other words, the physical entities can be any meaningful label that can be associated with the polygonal tile by way of the correlation therebetween. In addition, an absolute or local position of the physical entities using a coordinate system, referred to as georeference of the physical entities, is also identified in the indoor space. As mentioned earlier, the georeference can be any information which can be used to indicate the location of the physical entity may be based on an absolute coordinate system or a local coordinate system, as explained above.

At block 420, the indoor space is divided into a grid of tessellated polygonal tiles, i.e., polygonal tiles abutting adjacent polygonal tiles. The grid can be a multi-layered, hierarchical structure of such polygonal tiles, where the polygonal tiles in each level or layer of the hierarchical structure are representable by the polygonal tiles in the other levels, for instance, above and below that level. In other words, the floor plan of the indoor space can be obtained in any raster format and overlaid with the stacked planes, where each plane is made of polygonal tiles abutting adjacent polygonal tiles, the polygonal tiles forming the basic building block of the representation which is used to depict the indoor space. Such a multi-planar structure forms the hierarchically-related structure of polygonal tiles in which the polygonal tiles in one hierarchical level or plane bear a relationship with the polygonal tiles in the plane above and below that plane. For instance, the polygonal tiles in each hierarchical level are so sized and shaped that a polygonal tile higher in the hierarchical level can be, with certain approximation, represented by a collection of polygonal tiles in at least one lower hierarchical level, whether immediately adjacent to the hierarchical level or not. For instance, a polygonal tile higher in the hierarchical structure can contain within it a plurality of smaller polygonal tiles that are lower in the hierarchical structure.

Subsequently at block 430, the grid can be spatially indexed, i.e., the information of the grid can be spatially indexed to represent the indoor space, using the hierarchical structure of the polygonal tiles and the georeferenced physical entities. As part of spatial indexing of the grid, the physical entities and the polygonal tiles in various layers of the hierarchical structure, can be correlated such that the georeference of each physical entity is mapped with the corresponding polygonal tile in each hierarchical level. In addition, in said example, as part of the spatial indexing performed, the child polygonal tiles can be hierarchically linked to the polygonal tile at a higher level in the hierarchical structure, i.e., to the parent polygonal tile, so as to spatially index the grid into a tree-like hierarchical structure. In said example, the spatial indexing linking the georeferences of the physical entities with the polygonal tiles combined with the interlinked hierarchical relationship between the polygonal tiles provides for enhancing the flexibility with which the spatial indexing implemented. For example, with such a spatial indexing, a tree (or a tree-like) hierarchical structure can be created which allows for an effective manner of retrieval of the information from a particularly large collection of data such as that used for localization.

At block 440, once the spatial indexing is done, a grid map of the indoor space can be generated based on the spatially indexed grid. In an example, the grid map can include calibrated fingerprint data, integrated with the georeferences of the various physical entities and integrated with the hierarchical grid. The grid map can be further used for localizing the mobile device 110 to render ILBS to the mobile device 110.

FIG. 5 illustrates, as an example, a method of localizing mobile devices in an indoor space using a tessellated grid, for instance, for representing the indoor space. In describing examples of FIG. 5, reference is made again to the examples of FIGS. 1-3 for purposes of illustrating suitable components or elements for performing a step or sub-step being described and for the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 5 examples of method steps described herein are techniques are performed by the processor 305 executing one or more sequences of software logic instructions that constitute the localizer 180 and the ILBS provider 190 of the mobile device 110. In embodiments, localizer 180 and the ILBS provider 190 may include the one or more sequences of instructions within sub-modules. Such instructions may be read into the memory 310 from machine-readable medium, such as memory storage mobile devices. Execution of the sequences of instructions contained in the localizer 180 and the ILBS provider 190 in the memory 310 causes the processor 305 to perform the process steps described herein. It is contemplated that, in some implementations, some of the sub-modules, or any other portions of executable instructions constituting the localizer 180 and the ILBS provider 190 may be hosted at a remote device. In alternative implementations, at least some hard-wired circuitry may be used in place of, or in combination with, the software logic instructions to implement examples described herein. Thus, the examples described herein are not limited to any particular combination of hardware circuitry and software instructions.

As an example, the method 500 is executed after the preparatory phase as described with reference to method 400 is completed. Therefore, in said example, method 500 can be understood as an implementational continuation of method 400.

Accordingly, at block 510, the spatial data generated by the mobile device 110 to be localized is obtained when the mobile device is in the indoor space, for example, upon receipt of request for localization or a request for ILBS, or both. As an example, as mentioned earlier, the spatial data generated by the mobile device 110 can be information indicative of an instantaneous location, for instance, a global or absolute location of the mobile device. Accordingly, as an example, the spatial data can include variations, temporal or otherwise, in sensor data obtained from the mobile device which can indicate the instantaneous location of the mobile device. For the purposes of obtaining the spatial data, as an example, the position of the mobile device 110 in the indoor space can be monitored and, accordingly, the spatial data can be obtained therefrom.

At block 520, the spatial data of the mobile device 110 can be compared with the set of georeferences for the indoor space to identify a polygonal tile in the size-wise hierarchy in which the mobile device 110 can be potentially instantaneously located. The georeferences for instance, geo-coordinates, are cross-referenced with the spatial data, i.e., the calibrated fingerprint data, as well as the grid, i.e., the physical entities and the polygonal tiles in the grid, Therefore, when compared against the spatial data generated by the mobile device 110 in real-time (for localization), the polygonal tile in which the mobile device 110 is potentially instantaneously located can be directly identified.

At block 530, based on the localization of the mobile device 110, location-based services can be rendered to the mobile device 110, based on the polygonal tile identified by the localizer 180, as explained above. In the above example, once the spatial data and the polygonal tile have been linked, the localization of the mobile device 110 links it to the physical entities in the above identified polygonal tile. As part of indoor location-based services, amenities, stores, services, or offers available in the vicinity of the mobile device 110 may be recommended, searching capability for such amenities, stores, services, or offers may be provided, and routes for navigating the mobile device 110 through the indoor to places of interest or to a user-defined destination can be generated and provided to the mobile device 110.

Although the hierarchical structure, as envisaged by the present subject matter, has been described with the polygons higher in the hierarchy having a bigger size and smaller-sized polygonal tiles at lower levels of the hierarchy, any other manner of correlating the shapes and sizes of the polygonal tiles in the multiple layers may be implemented. For example, the hierarchy may be inverted and, instead, a larger polygonal tile may be lower in the hierarchy with respect to the smaller polygonal tiles.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method comprising:
   identifying a plurality of physical entities in an indoor space, wherein a physical entity represents a structural feature of the indoor space and is not a network source and a signal source;
   georeferencing each of the physical entities to a coordinate system;
   dividing the indoor space into a grid of a plurality of polygonal tiles abutting adjacent polygonal tiles, the grid comprising a hierarchical structure of the plurality of polygonal tiles, wherein a polygonal tile at a level in the hierarchical structure is representable by polygonal tiles at other levels in the hierarchical structure;
   indexing, spatially, the grid with the physical entities in the indoor space, the indexing comprising associating each physical entity with a polygonal tile from amongst the plurality of polygonal tiles in each hierarchical level in the hierarchical structure to correlate a georeference of the physical entity with the polygonal tile in each hierarchical level;
   implementing an identifier allocation scheme to associate an identifier with each of the plurality of polygonal tiles, the identifier having the georeference embedded therein, the identifier allocation scheme is based on parameters associated with the polygonal tile, the parameters including at least one of an orientation of the polygonal tile, a size of the polygonal tile, and polygonal tiles neighboring the polygonal tile; and
   generating a grid map for the indoor space based on the indexing for localization of mobile devices in the indoor space, wherein spatial data of a mobile device is compared with a set of georeferences for the indoor space to identify a polygonal tile in which the mobile device is instantaneously located, the spatial data including sensor data obtained by the mobile device.

2. The method of claim 1, wherein the plurality of polygonal tiles have a symmetrical hexagon shape.

3. The method of claim 1, wherein the plurality of polygonal tiles have one of a same asymmetrical polygon shape and different symmetrical polygon shapes.

4. The method of claim 1, wherein a first set of polygonal tiles in one hierarchical level in the hierarchical structure are symmetrical and of a first shape and a second set of polygonal tiles in another hierarchical level in the hierarchical structure are symmetrical and of a second shape, wherein a plurality of second set of polygonal tiles cover a single polygonal tile from the first set.

5. The method of claim 1, wherein the indexing comprises spatially indexing child polygonal tiles from amongst the plurality of polygonal tiles hierarchically linked to a parent polygonal tile from amongst the plurality of polygonal tiles at a higher level in the hierarchical structure.

6. The method as claimed in claim 1, wherein the physical entity representing the structural feature of the indoor space includes at least of walls, passages, hallways, elevator shafts, escalators, open spaces, doorways, kiosks, stores, alleys, holes, a café, and a salon.

7. The method as claimed in claim 1, wherein based on association between the plurality of polygonal tiles on the grid map, analytics data is associated with the plurality of the polygonal tile to provide information pertaining to a selected polygonal tile.

8. A server computing device comprising:
- a processor; and
- a memory storing a set of instructions, the set of instructions executable in the processor to:
  - identify a plurality of physical entities in an indoor space, wherein a physical entity represents a structural feature of the indoor space and is not a network source and a signal source;
  - georeferencing each of the physical entities to a coordinate system;
  - divide the indoor space into a grid of a plurality of polygonal tiles abutting adjacent polygonal tiles, the grid comprising a hierarchical structure of the plurality of polygonal tiles, wherein a polygonal tile at a level in the hierarchical structure is representable by polygonal tiles at other levels in the hierarchical structure;
  - index, spatially, the grid with respect to the physical entities in the indoor space, the indexing comprising associating each physical entity with a polygonal tile from amongst the plurality of polygonal tiles in each hierarchical level in the hierarchical structure to correlate a georeference of the physical entity with the polygonal tile in each hierarchical level;
  - implement an identifier allocation scheme to associate an identifier with each of the plurality of polygonal tiles, the identifier having the georeference embedded therein, the identifier allocation scheme is based on parameters associated with the polygonal tile, the parameters including at least one of an orientation of the polygonal tile, a size of the polygonal tile, and polygonal tiles neighboring the polygonal tile; and
  - localize mobile devices in the indoor space based on the indexing, wherein a grid map is generated to represent the indoor space based on the indexing, wherein spatial data of a mobile device is compared with a set of georeferences for the indoor space to identify a polygonal tile in which the mobile device is instantaneously located, the spatial data including sensor data obtained by the mobile device.

9. The server computing device of claim 8, wherein the plurality of polygonal tiles have symmetrical hexagon shape.

10. The server computing device of claim 8, wherein the plurality of polygonal tiles have one of same asymmetrical polygon shape and different symmetrical polygon shapes.

11. The server computing device of claim 8, wherein a first set of polygonal tiles in one hierarchical level in the hierarchical structure are symmetrical and of a first shape and a second set of polygonal tiles in another hierarchical level in the hierarchical structure are symmetrical and of a second shape, wherein a plurality of second set of polygonal tiles cover a single polygonal tile from the first set.

12. The server computing device of claim 8 further comprising instructions executable in the processor to index, spatially, with respect to the indoor space, child polygonal tiles from amongst the plurality of polygonal tiles hierarchically linked to a parent polygonal tile from amongst the plurality of polygonal tiles at a higher level in the hierarchical structure.

13. The server computing device of claim 8, wherein the physical entity representing the structural feature of the indoor space includes at least of walls, passages, hallways, elevator shafts, escalators, open spaces, doorways, kiosks, stores, alleys, holes, a café, and a salon.

14. The server computing device of claim 8, wherein based on association between the plurality of polygonal tiles on the grid map, analytics data is associated with the plurality of the polygonal tile to provide information pertaining to a selected polygonal tile.

* * * * *